UNITED STATES PATENT OFFICE.

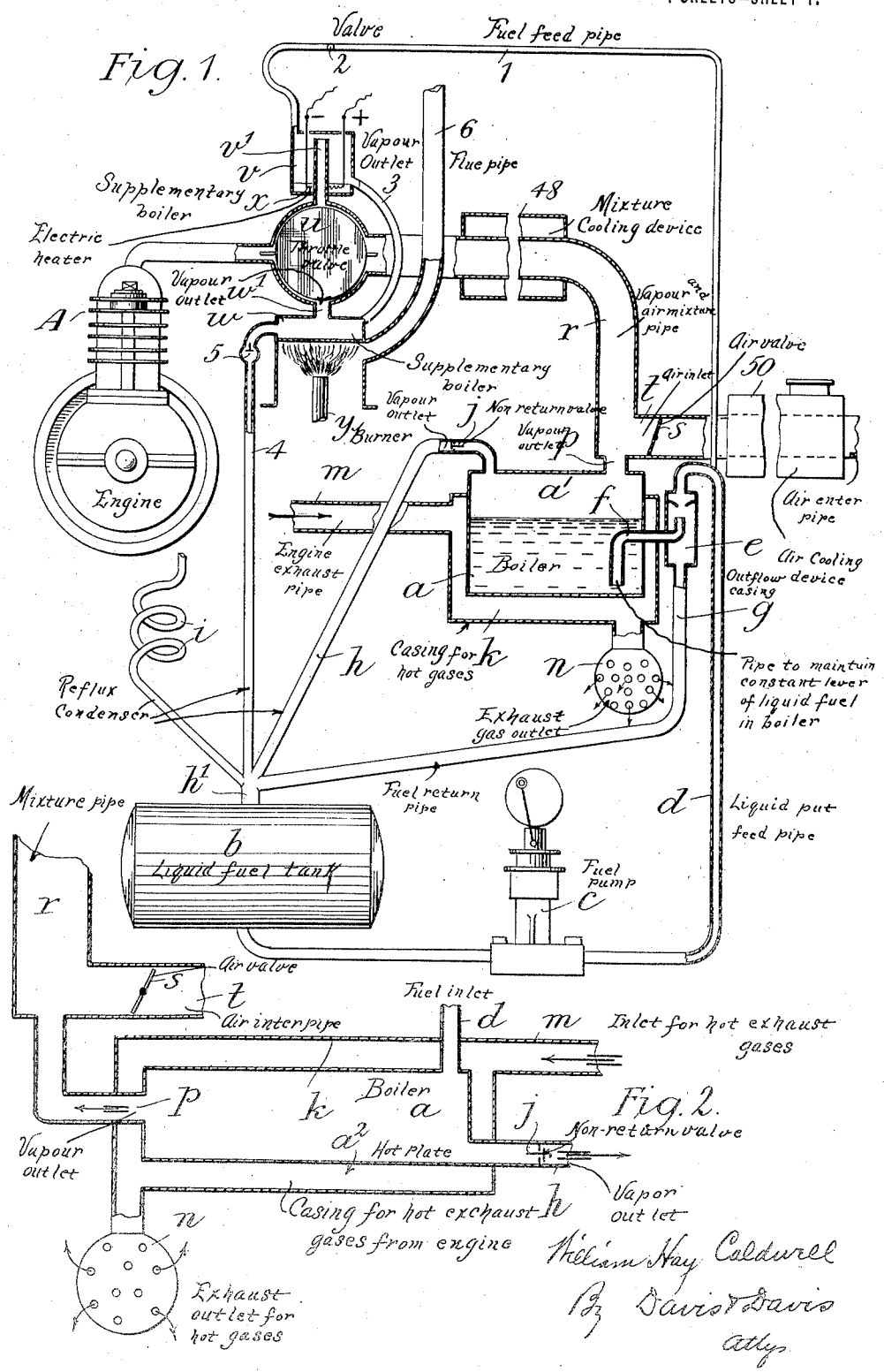

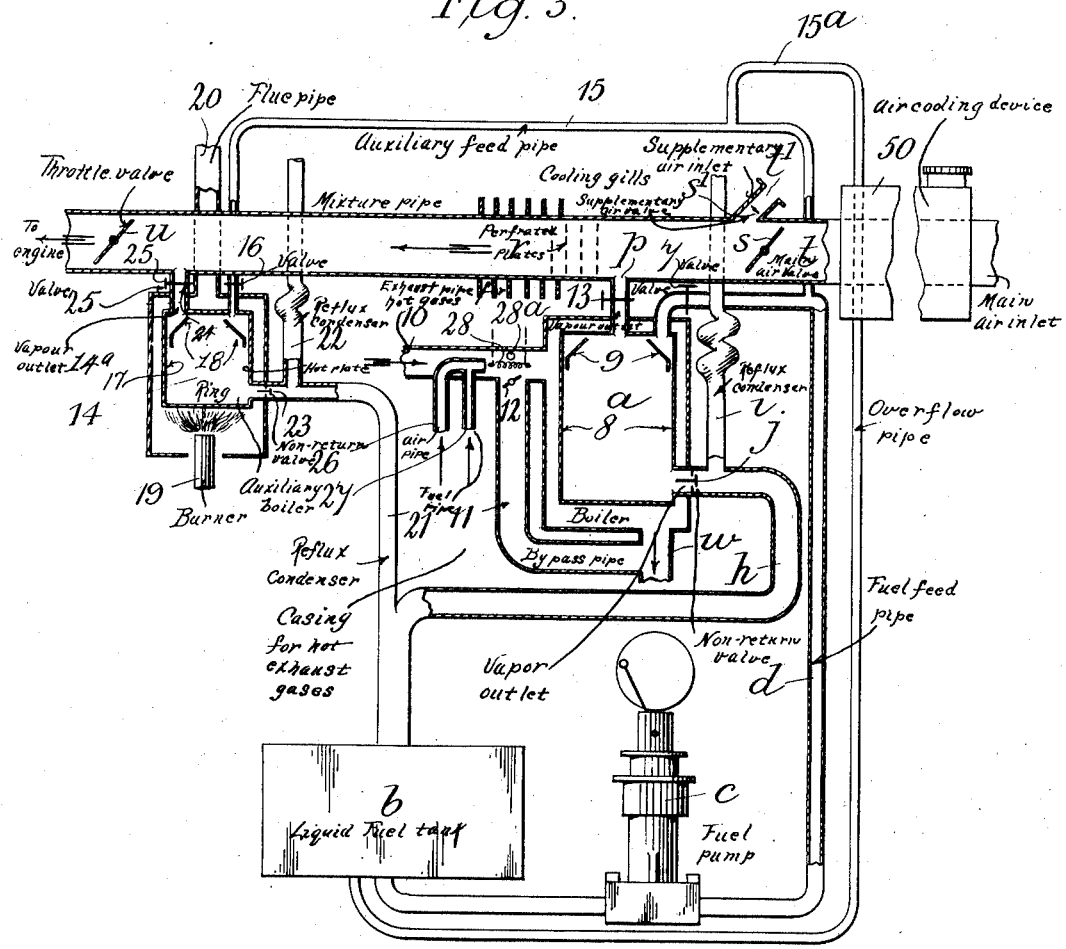

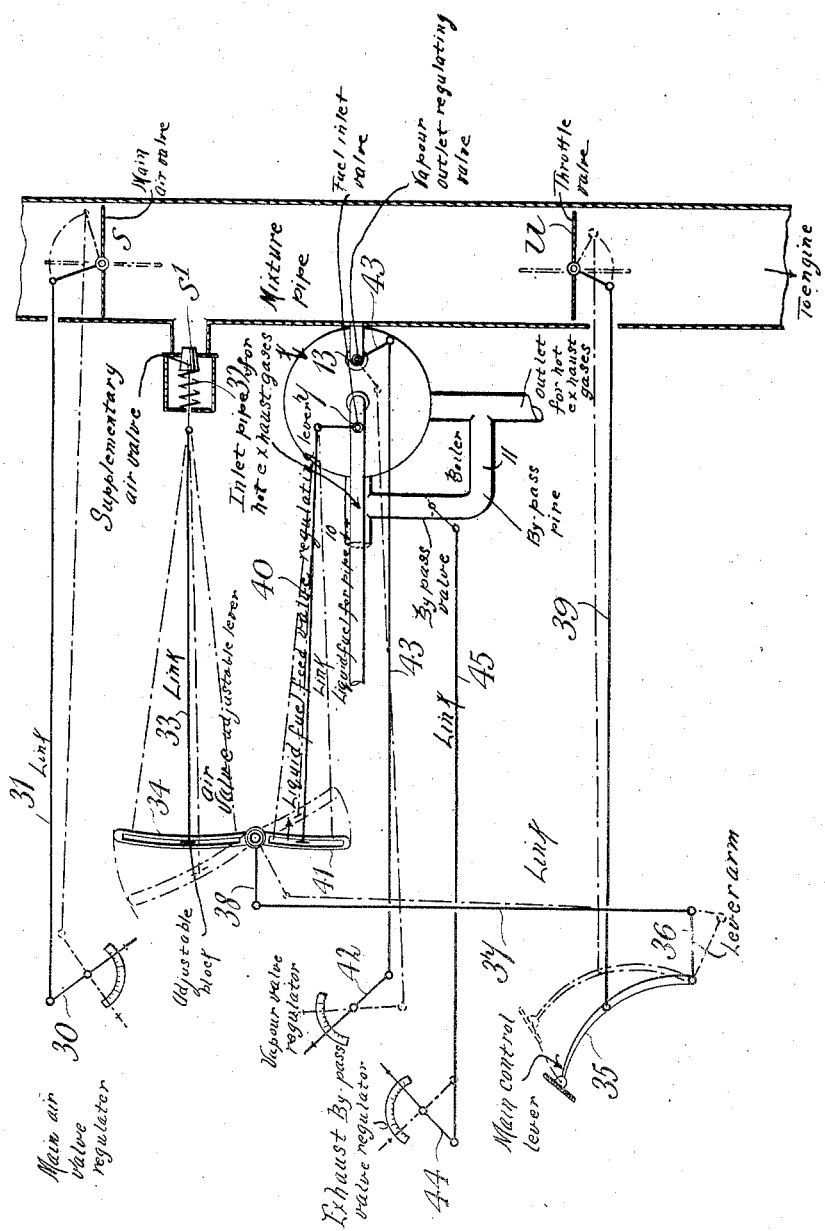

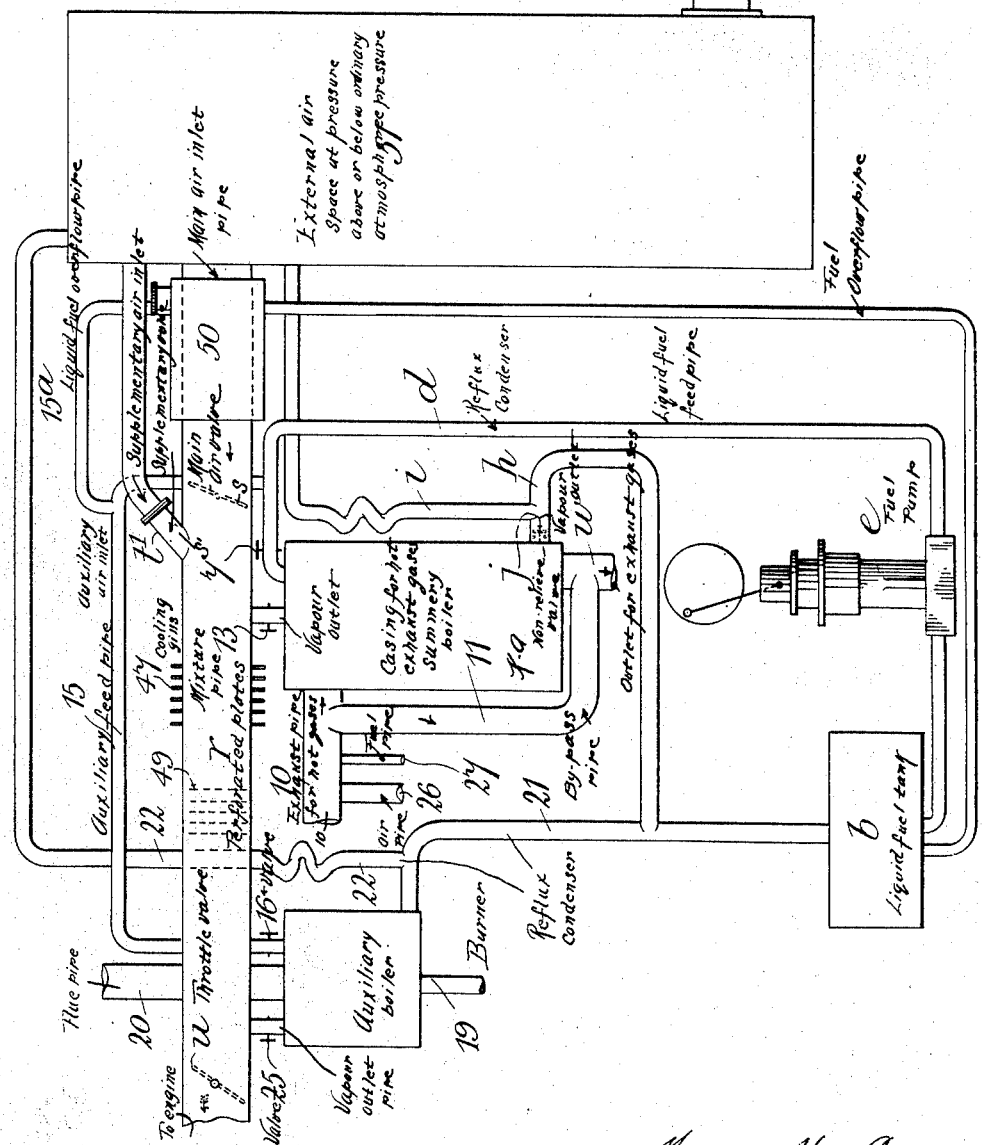

WILLIAM HAY CALDWELL, OF MALLAIG, SCOTLAND.

FUEL-SUPPLY OF INTERNAL-COMBUSTION ENGINES.

1,366,242.  Specification of Letters Patent.  Patented Jan. 18, 1921.

Application filed December 26, 1917. Serial No. 208,969.

*To all whom it may concern:*

Be it known that I, WILLIAM HAY CALDWELL, a subject of the King of Great Britain and Ireland, residing at Mallaig, Inverness-shire, Scotland, have invented Improvements in or Relating to the Fuel-Supply of Internal-Combustion Engines, of which the following is a specification.

This invention has reference to the fuel supply of internal combustion engines, and it has for its object to enable liquid fuel, including the heavier hydrocarbon oils such as paraffin, kerosene, and the like, to be vaporized, and the resulting vapor supplied to the engine cylinder or cylinders in conjunction with the air supply in a more advantageous manner than heretofore.

To this end the liquid fuel is, before being drawn into the engine cylinder or cylinders, converted by heat obtained from any suitable source, into vapor at constant temperature and pressure and intimately mixed with air before being supplied to the engine.

For this purpose the liquid is converted into vapor in a vessel (hereafter called a boiler), which is heated in any convenient way by heat obtained from any convenient source so as to produce an amount of vapor in excess of that needed for the engine, and associated with the vapor-space of which are means, such as a reflux condenser or its equivalent, such as a pipe of sufficient cross-sectional area as not to become sealed by condensation of liquid therein, so that the vapor space of the boiler is in free communication with the external atmosphere, and whereby the surplus vapor after leaving the vapor space and being condensed, can be returned either to the liquid fuel supply tank or to an auxiliary tank, suitably placed. Or the surplus vapor may alternatively be led through a pipe such as described, to be condensed in the liquid fuel supply tank, in which case this tank may be cooled by the provision of external ribs or similar means, and be in free communication with the external atmosphere above the liquid fuel therein, either directly or through the pipe referred to or otherwise, so that the vapor space of the boiler in each case is normally in free communication with the atmosphere external to such vapor space. All such arrangements for placing the vapor space of the boiler in free communication with the atmosphere external to the vapor space of the boiler and for condensing the surplus vapor, are hereinafter included in the generic term "reflux condenser." The arrangement is such that the liquid fuel is continuously converted into vapor before being drawn into the engine, the construction of the boiler and the reflux condenser insuring that the vapor shall be maintained at constant pressure, for example that of the atmosphere external to the boiler, and at constant temperature, namely that of the boiling point of the liquid fuel used, at the pressure mentioned.

The reflux condenser may be cooled either by air or by water where convenient.

A light non-return valve or valves may be associated with the reflux condenser to prevent air and liquid fuel being drawn therethrough and through the vapor space of the boiler by the engine when starting, and before the boiler is properly working, as such admission of air would prevent the supply of vapor from the boiler to the engine.

The boiler can be variously constructed. It may be of a nature to contain a body of liquid fuel, but it is preferred to use one of the nature of a "two-stream" boiler, that is to say, a boiler from which the vapor issues in two streams flowing in directions more or less opposite to or away from each other, and comprising a hot plate or surface over which liquid fuel is distributed in a thin layer or film.

The heating of the boiler and consequent vaporization of the liquid fuel, can normally and with advantage, be effected wholly by the heat of the exhaust gases from the engine.

For starting purposes, liquid fuel may be collected in a small auxiliary vessel or vessels and be heated and vaporized by the flame of a lamp, with or without the aid of an air blast, or by heat from an electric current, or by each of these means, and used until the engine is properly in motion and the boiler heated to the desired temperature by the hot exhaust gases escaping therefrom. Such an arrangement can be used also as a means for utilizing additional heat and providing additional vapor, when required. Or for starting purposes, an air blast may be used to spray liquid fuel into the main exhaust pipe, the resulting mixture being ignited by some suitable means, such as an electric spark or small resistance wire, suitably placed, in order to heat the main boiler. Each of these arrangements may be provided and used as and when desired. If a small auxiliary starting vessel or vessels be used, it or each of them should be in free communication with the external atmosphere in order to prevent the main boiler acting as a condenser to the vapor produced in it or them when starting.

A by-pass may be associated with the exhaust pipe in order that the proportion of the exhaust gases passing through the heating space of the boiler, and consequently the amount of heat supplied to the boiler, may be capable of being regulated, and also to prevent the boiler being cooled down to any considerable extent by the passing through it of air drawn through the engine when the engine is running free, as for instance when the engine is running down hill.

The whole boiler or vapor generating system can be maintained at any desired pressure, either at or below, or above that of the ordinary external atmosphere, as by using, in the latter two cases, suitable valves and pumps, without interfering with the essential result, namely the vaporization of the liquid fuel at a constant temperature and pressure. To insure this result it is important that in each case the vapor space of the boiler should normally be in free communication with the external atmosphere, as through the outlet for surplus vapor, or with an external space either above or below the ordinary atmospheric pressure and from which air is supplied to the engine.

The liquid fuel is supplied to the boiler through a valve, which may be positively connected, as by a link and levers, to the main throttle valve, of the engine, so that the amount of fuel supplied will vary with the load on the engine. The vapor outlet from the boiler to the engine should be situated in such a position in relation to the liquid fuel feed inlet to the boiler that the vapor is drawn off to the engine only over the surface from which it is evolved and may not travel over any considerable expanse of the boiler at a higher temperature, in order that all the vapor may be taken off at boiling point and not in a super-heated state.

Associated with the vapor outlet of the boiler and an air supply valve, is a valve, for example a main throttle valve, adapted to control the supply of air and vapor to the engine.

To effect the mixture of air and vapor in the required proportions, the sizes of the openings through which these are drawn by the motion of the engine, are regulated by valves. Such proportions will be practically unaffected by change of velocity of flow, the ratio of the volume of vapor drawn through the vapor outlet to the engine in a given time to the volume of air drawn through the air supply valve or valves during the same period being approximately equal to $$\frac{A_2}{A_1}\sqrt{\frac{d_1}{d_2}}$$

where $d_1$ is the density of the external atmosphere, $d_2$ the density of the vapor within the boiler, $A_1$ the cross sectional area of the opening or openings through which the air is drawn, that is to say, the air inlet or inlets to the engine, and $A_2$ the cross sectional area of the opening through which the vapor is drawn, that is to say, the vapor outlet to the engine.

To adjust the proportions of air to suit varying speeds of and loads on the engine, an extra air valve may be provided, positively connected, as by a link and levers, to the main throttle valve which governs the admission of the mixture of the air and vapor to the engine, so that if the main throttle or mixture valve be partially closed to reduce the power of the engine, the extra air valve will be partially closed to reduce the supply of air without affecting the supply of vapor, so that a richer mixture will then be produced. In this way the mixture can be adjusted to suit different compressions in the engine cylinder or cylinders.

In order to produce as intimate a mixture as possible, of the vapor from the boiler and the air necessary for its combustion, and thus to cause this combustion to take place in the engine cylinder or cylinders as rapidly as possible, for maximum efficiency, the air supply should be at a low temperature when brought into contact with the vapor from the vapor outlet from the boiler. Thus, the vapor being at a comparatively high temperature and its molecules or particles consequently farther apart, the molecules or particles of air, being relatively closer together, are allowed to pass between and surround the vapor molecules or particles more completely, and thus to approximate more nearly to the ideal condition for rapidity of chemical action, wherein each molecule of fuel is completely surrounded by the requisite number of molecules of oxygen for its complete combustion, this intimate mixing being aided by the currents set up by the sudden bringing together of the cold air and hot vapor. In order to bring about the aforesaid condition, the air should be admitted at the temperature of the outside atmosphere, or, it may be, artificially cooled by suitable means.

Further to assist the mixing, means such as one or more perforated or deflecting vanes may be placed in the path of the flowing mixture.

The admixture of the cold air with the heated vapor will cool the latter, and thus increase the density of the mixture.

I have found that when vapor produced from a heavy hydrocarbon as herein described is intimately mixed with the amount of air required for its complete combustion, in the manner herein described, it assumes the form of a fine cloud or mist of condensed vapor which remains surrounded by the molecules of air and which can travel long distances in cold pipes without aggregating to larger liquid globules, being therefore, for combustion purposes, practically equal to an intimately associated gaseous mixture.

This is of importance as, for producing a given power, a less volume of the mixture at greater density can be used than is possible when the mixture is intentionally heated with a view of maintaining it in a gaseous state. Consequently, an engine using my cold mixture can be made smaller for a given power than would otherwise be the case. To this end the mixture pipe is preferably arranged and adapted, as by gills thereon, to be air-cooled, and special means may be provided according to the invention for cooling the mixture tube even below the ordinary temperature of the external atmosphere, say to or about freezing point when the temperature of the atmosphere is above this point. The cooling of the mixture and consequent increase in its density, is of special advantage in the case of engines for aircraft, as the loss of density of the mixture which would otherwise result, owing to lower air pressures at high altitudes, can be automatically compensated for.

In the accompanying illustrative drawings, Figure 1 shows diagrammatically, in side elevation, one arrangement of apparatus embodying the invention. Fig. 2 is a similar view showing a modification. Fig. 3 is a similar view to Fig. 1, showing the preferred arrangement of such apparatus. Fig. 4 shows, diagrammatically, means for controlling the position of the throttle valve of the engine and the supply of liquid fuel to the boiler and of vapor and air to the mixture pipe and thence to the engine.

Fig. 5 is a diagrammatic view.

Referring to Fig. 1, $a$ represents a boiler to which liquid fuel is supplied from a tank $b$ by a pump $c$ through a pipe $d$ and a feed device comprising a casing $e$, a bent pipe $f$ for supplying liquid fuel to and maintaining it at a constant level in the boiler $a$ and an overflow or return pipe $g$ for returning surplus liquid fuel to the supply tank $b$. $h$ is a pipe leading from the upper part of the vapor space $a^1$ of the boiler and in communication with a reflux condenser $i$, the connection at $h'$ between the two being in communication with the upper part of the supply tank $b$ to which excess vapor from the boiler when reliquefied in the said pipe $h$ and condenser $i$ is returned. The pipe $h$ should be of sufficient cross section to prevent it being sealed by liquid resulting from condensation of the escaping surplus vapor and thus to allow of the atmosphere gaining access thereto to allow of vapor being produced in the boiler at atmospheric pressure. $j$ is a light non-return valve in the pipe $h$ for the purpose of preventing air being drawn through this pipe and through the vapor space $a^1$ of the boiler $a$ by the engine at starting and before the boiler is properly working, as hereinbefore mentioned. $k$ is a heating jacket surrounding the boiler $a$ and through which hot exhaust gases from the engine are led from a pipe $m$ to an outlet $n$. $p$ is an outlet port or pipe for conducting vapor from the vapor space of the boiler to the engine through a mixture pipe $r$; $s$ is an adjustable air inlet valve in the air supply pipe $t$, and $u$ is a main throttle valve for controlling the supply of the combustible mixture of air from the pipe $t$ and vapor from the outlet $p$ through the mixture pipe $r$ to the engine indicated at A. The air valve $s$ can be set to give the desired proportion of air to vapor for maximum speed and load purposes. To reduce the proportion of air to vapor to adjust the mixture to suit varying speeds and loads, the throttle valve $u$ can be suitably connected to the air valve $s$, as for instance in the manner hereinafter described with reference to an auxiliary air valve, so as to reduce the air supply without affecting the vapor supply when the throttle valve is more or less closed.

$v$ and $w$ are auxiliary vaporizing vessels for use when starting the engine. They contain a small quantity of liquid fuel and are heated respectively by an electric resistance device $x$ and a lamp $y$ only for starting. The two vessels are in communication with the mixture supply pipe $r$ through pipes or passages $v^1$ and $w^1$ respectively. The vessel $v$ is in communication with a liquid fuel supply pipe 1 which is provided with a hand controlled valve 2, and the vessel $v$ is in communication with the vessel $w$ and supply tank $b$ by overflow pipes 3 and 4 respectively, the latter pipe being provided with a non-return valve 5. The pipes 3 and 4 serve to allow the excess vapor produced in the boilers $v$ and $w$ to escape freely therethrough and become condensed therein and returned to the tank $b$ without preventing the external atmosphere gaining admission thereto. For this purpose they should, like the pipe $h$, be made of sufficient cross sectional area to prevent the liquid condensed therein sealing them. The non-return valve 5 acts similarly to the non-return valve $j$, for preventing air being drawn through the auxiliary vessels $v$ and $w$ when starting the engine, and afterward when the engine is properly at work. 6 is a flue pipe.

The mode of working is as follows:—For starting the engine, the valve 2 in the pipe 1 is opened, the boiler $v$ or $w$ or both of these boilers, is or are heated, as described, to produce vapor therein which passes into the mixture pipe or chamber, $r$ the air valve $s$ is suitably adjusted to provide the requisite proportion of air to vapor for producing a combustible mixture, the throttle valve $u$ is fully opened and the crank shaft of the engine turned so as to operate the fuel pump $c$ and also to draw air through the pipe $t$ past the valve $s$ and into the mixture pipe $r$ and produce therein, with the vapor, a combustible mixture that is drawn into the engine cylinder or cylinders and fired so as to start the engine, the hot exhaust gases from which then pass through the casing $k$ and heat the main boiler $a$ and the liquid fuel therein. Owing to the presence of the non-return valve $j$ air cannot be drawn from the atmosphere through the pipe $h$ and the vapor space $a^1$ of the boiler $a$ on the suction stroke of the engine at starting, so that volatilization of the liquid fuel in the boiler $a$ can readily take place and the resulting vapor be drawn into the pipe $r$ with air from the air pipe $t$, and the resulting mixture drawn into the engine. When the engine is properly started, the valve 2 is closed and the heating of the auxiliary boilers $v$ and $w$ discontinued. The surplus vapor that will be produced in the main boiler $a$, when the latter is properly working, can freely escape through the pipe $h$ and become more or less condensed therein and the resulting liquid returned to the tank $b$ and thus to the liquid fuel supply system so that it cannot interfere with the proper generation of the vapor in the boiler $a$ which it would do if allowed to fall back through the vapor space $a^1$ of the boiler and cool the liquid in the boiler. Furthermore, as the boiler is in free communication with the external atmosphere through the pipe $h$ and reflux condenser $i$, the generation of the vapor in the boiler $a$ will take place under constant pressure, namely that of the atmosphere, and at constant temperature, namely the boiling point at that pressure, of the liquid fuel used. Any vapor not condensed in the pipe $h$ and passing into the reflux condenser $i$ will be condensed in the latter and fall into the tank $b$. The air valve $s$ may be so adjusted as to admit sufficient air, when mixed with the vapor drawn through the passage $p$, to produce a perfectly combustible mixture for maximum speed and load and full compression and then be connected to the main throttle valve $u$ when this valve is full open, so that closing of the throttle valve to reduce the compression and power of the engine to suit requirement, will simultaneously close the air valve to a greater or less extent without affecting the vapor outlet passage $p$, so that a richer mixture will then be produced to suit the lower compression then obtaining. In this way a practically perfect combustible mixture at all speeds of the engine can be produced.

The boiler may with advantage be of the type known as a "flash" boiler. Fig. 2 indicates diagrammatically a boiler of this kind. In this case, $a$ is the boiler, $d$ the liquid fuel supply pipe thereto, $p$ the outlet for vapor and $h$ the outlet pipe, of large section, for the escape of the surplus vapor which is always generated, usually many times as much vapor as is used in the engine being generated. $j$ is the non-return valve in the pipe $h$ and $k$ is the casing having an inlet pipe $m$ and outlet pipe $n$ through which hot exhaust gases from the engine pass and heat the boiler $a$. When, in this case the outlet pipe $h$ for the surplus vapor is far removed from the gas outlet $p$ to the mixture tube $r$ and there is little liability of air being drawn direct through it to the outlet $p$ through the vapor space in the boiler $a$, the non-return air valve $j$ may be omitted. Also, in this case no means are necessary for providing a constant level of liquid fuel in the boiler. In this example, the liquid fuel entering the boiler $a$ by the pipe $d$ falls upon the heated bottom $a^2$ of the boiler and flows over the surface thereof in the form of a film which is quickly converted into vapor part of which passes through the outlet $p$ to the engine and the remainder through the pipe $h$ that forms the reflux condenser, or part thereof.

In order to prevent ebullition and splashing up of the liquid fuel fed into the boiler, so that the vapor drawn off to the engine shall be in as dry a state as possible it is prefered to use a hot plate over which the liquid fuel fed into the boiler is distributed. In a boiler of this kind, which is the one at present preferred, the distribution of the liquid fuel should take place only under the influence of gravity, unless some mechanical means of distribution be employed, so that the vaporization of the liquid fuel is in no way due to convection currents, but solely to the spreading of a film of the liquid fuel over the hot plate. The vapor space of the boiler should be so constructed that all parts of it with which the vapor may come in contact are sufficiently heated by conduction of the heat from the exhaust gases as not to allow condensation to take place except in the condenser, where such condensation produces no effect upon the vapor being generated inside the boiler, and the vapor space and the condenser should be of such relative dimensions that the pressure within the vapor space is atmospheric, or such other pressure as may be employed over the whole system. Also, the outlet to the condenser should be placed at a point in the boiler as far away from the vapor outlet to the engine as is possible, so that the stream of surplus vapor passing to the reflux condenser may flow in the opposite direction to the stream of vapor passing to the engine, in order that this latter stream should not mix with vapor which has come into contact with the portion of the hot plate uncovered by the liquid film, and which is therefore superheated. If the arrangement described were not adopted, convection currents would be started, and a variable amount of superheat set up in the vapor drawn off to the engine which would adversely affect the proper working of the engine. In an arrangement of this kind the hot plate may conveniently be in the form of a vertical tube closed at the top and bottom and around which the exhaust gases are allowed to circulate within an outer casing, the inner vertical tube having an outlet at the top and another at the bottom, the liquid fuel being fed on to and spreading as a film over the inner surface of the tube, part of the resulting vapor passing to the engine through the upper outlet and the surplus vapor passing downward to the lower outlet and thence to the reflux condenser.

An arrangement of apparatus according to the invention embodying such a construction of boiler or vapor generator is shown diagrammatically in Fig. 3. In this example $a$ represents the boiler into which liquid fuel is fed from a tank $b$ by a pump $c$ through a feed pipe $d$ fitted with a feed control valve 7. 8 is the hot plate in the form of a tube arranged vertically, the liquid fuel being distributed over its inner surface by means of the distributing ring 9. The hot plate is heated externally by the passage around it of hot exhaust gases from the engine exhaust pipe 10. The pipe 11 forms a by-pass through which by suitable adjustment of the regulating valve 12, any desired proportion of the hot exhaust gases can be caused to pass direct to the exhaust outlet 13 without passing around the boiler.

By causing the liquid fuel to be distributed over the surface of the hot plate in a film, ebullition and splashing up of the liquid fuel from the hot surface is prevented, so that the vapor produced is in a dry state, that is to say, is free from liquid aggregations.

The boiler has associated with it a reflux condenser in communication with the supply tank $b$ and with the external atmosphere and comprising pipes $h$ and $i$, as in Fig. 1, or, when the whole system is maintained at a pressure above or below that of the external atmosphere, in communication with an external space maintained at the required pressure. $j$ is a light non-return valve in the condenser pipe $h$, as before.

The vapor outlet $p$, provided with a vapor regulating valve 13, leads into the mixture-tube $r$, which is provided with a main air inlet pipe $t$ with regulating valve $s$ and with a supplementary air inlet pipe $t^1$ with controlling valve $s^1$ and is connected to the engine through the main throttle valve $u$. The valve $s^1$ is connected to the main throttle valve $u$, as also may be the feed control valve 7. 14 is an auxiliary boiler for starting purposes. It is fed with liquid fuel through a branch pipe 15 fitted with a feed control valve 16; it has a hot plate 17 provided with a distributing ring 18 and is heated by a lamp 19, 20 being the flue pipe. With it is associated a reflux condenser comprising a pipe 21 leading back to the main tank and a pipe 22 in communication with the external atmosphere or other external space as hereinbefore described and is fitted with a light non-return valve 23. The vapor from this auxiliary boiler passes into the mixture pipe and thence to the engine through a vapor outlet pipe 24 controlled by a vapor control valve 25.

26 is a pipe through which a blast of air can be caused to flow and induce liquid fuel to flow through a supply pipe 27 and produce a combustible mixture that flows into the exhaust pipe 10 where it may be ignited, as by an electric heating device 28, or by a torch inserted through a normally closed opening 28ª, to produce flame and hot gases for heating the hot plate 8 at starting.

15ª is a pipe that serves as an overflow from the pump $c$ and pipe 15 back to the tank $b$.

Fig. 4 shows how the various valves of the apparatus can be readily controlled. In this arrangement the main air valve $s$ is arranged to be controlled from a hand lever 30 through a link 31. The auxiliary air valve $s^1$ is arranged to be opened, against the action of a spring 32, through a link 33 operated from a lever 34 which is actuated from the main control lever 35 of the throttle valve $u$ through a lever arm 36, link 37 and lever arm 38 the throttle valve $u$ being connected to the hand control lever 35 through a link 39. The fuel inlet valve 7 is controlled through a link 40 from another lever arm 41 worked from the main control lever 35 through the lever 36, link 37 and lever arm 38. As will be seen the arrangement is such that when the throttle valve $u$ is moved by the lever 35 in a direction to close it more or less, the auxiliary air inlet valve $s^1$ is closed more or less and the feed inlet valve 7 is partly closed without affecting the vapor outlet valve 13. The vapor outlet valve 13 is controlled from a separate hand lever 42 through a link 43. The exhaust control or cut out valve 12 (Fig. 3) is controlled from another hand lever 44 through a link 45 and lever arm 46.

The mode of working of this arrangement is as follows:—

For starting the engine, the valve 16 in the pipe 15 (Fig. 3) may be opened, and the auxiliary boiler 14 heated by means of the lamp 19, to produce vapor therein, which passes into the mixture tube $r$ by means of the vapor outlet 24 regulated by the valve 25, the surplus vapor passing down the condenser tube 21 back to the tank $b$. The throttle valve $u$ is opened, and the crank shaft of the engine turned so as to operate the fuel pump $c$ and also to draw cold air past the valves $s$ and $s^1$ which are suitably regulated to admit the required quantity of air into the mixture tube $r$ and produce therein with the vapor, an intimately mixed combustible mixture, which is drawn into the engine cylinder or cylinders and fired so as to start the engine, the hot exhaust gases from which then pass through the exhaust pipe 10, and passing around the tubular hot plate 8 of the main boiler $a$, heat such hot plate and the film of liquid fuel fed on to it by means of the feed valve 7 on the main feed pipe $d$ and the distributing ring 9. Owing to the presence of the non-return valves $j$ and 23, air cannot be drawn from the external atmosphere through either of the boilers $a$ or 14, on the suction strokes of the engine at starting, so that volatilization of the liquid fuel can readily take place and the resulting vapor be drawn into the mixture tube $r$ with air through the valve controlled air inlet pipes $t$ and $t^1$ and the resulting mixture drawn into the engine cylinder or cylinders. Or, instead of starting the engine by the aid of the auxiliary boiler 14, as just described, it may be started by heating the hot plate 8 of the boiler $a$ by the combustion of liquid fuel sprayed into the exhaust pipe 10 from the pipe 27 by air forced through the pipe 26, as hereinbefore described.

When the engine is properly started, the valve 16 may be closed and the heating of the auxiliary boiler 14 discontinued, if this boiler has been used, or the fuel spray device 26, 27 is put out of action, if this has been used. Part of the vapor that will then be produced in the main boiler $a$ when the latter is properly working can freely escape through the outlet $p$ into the mixture pipe $r$ and the surplus vapor will flow down to the outlet $p^1$ at the bottom of the boiler and flow freely through the pipe $h$ and become condensed therein, the resulting liquid being returned to the tank $b$, and thus to the liquid fuel supply system, so that it cannot interfere with the proper generation of the vapor in the boiler $a$, which it would do if allowed to fall back into the boiler and thus condense the vapor formed therein.

Furthermore, as the boiler $a$ is in free communication with the external atmosphere through the pipe $i$, the generation of the vapor in the boiler $a$ will take place under constant pressure, namely that of the atmosphere, and at constant temperature, namely the boiling point at that pressure of the liquid fuel used.

The vapor drawn off to the engine through the vapor outlet pipe $p$ and mixture pipe $r$, since it flows directly off the surface of the liquid film upon the hot plate 8, and travels in a direction directly opposite to the stream of surplus vapor passing out to the condenser tube $h$, it will not come into contact with any portion of the hot plate uncovered by the liquid film, nor with any vapor which may have become superheated through the influence of such uncovered portion of the hot plate, and therefore is admitted to the mixture tube $r$ at its boiling point, and free from superheat.

Moreover, through the action of the distributing ring 9, the liquid fuel is present upon the hot plate in the form of a film only, and therefore the vapor is not given off in a wet state through ebullition and splashing up of liquid, but is furnished to the mixture tube $r$ as dry as possible.

The air valves $s$ and $s^1$ serve to adjust the quantity of air admitted to provide, with the vapor supplied through the outlet $p$, the combustible mixture for the engine, the extra air valve $s^1$ being connected to the main throttle valve $u$ through its lever 35 (Fig. 4) as hereinbefore described, so that closing of the throttle valve $u$ more or less to reduce the compression and power of the engine to suit varying requirements will simultaneously close the auxiliary air valve $s^1$ to a greater or less extent without affecting the outlet of vapor from the boiler, so that a richer mixture will then be produced to suit the lower compression then obtaining. In this way a practically perfect combustible mixture at all speeds of the engine can be obtained. At the same time, the supply of liquid fuel through the valve 7 may be reduced by the movement of the control lever 35 as hereinbefore described. The main air valve $s$ may be adjusted from time to time by the hand lever 30 to suit varying atmospheric or other conditions.

The vapor from the boiler $a$ being admitted to the mixture tube $r$ at the boiling point of the liquid fuel, and the air being drawn in, in a relatively cold condition, the closely aggregated molecules of air are forced between the molecules of fuel, which are relatively further separated by reason of their higher temperature. The condensed particles of fuel become therefore held in suspension by the molecules of air which surround them, and thus a more perfect explosive mixture is produced than would otherwise be the case.

This mixture may be further cooled down while passing through the mixture tube $r$, before reaching the engine cylinder or cylinders by providing the mixture tube with external cooling ribs or gills 47 (Fig. 3), or by arranging it to extend through a cooling or refrigerating box or chamber 48 (Fig. 1), without causing the particles of fuel to aggregate to larger liquid globules. In this way a denser mixture may be obtained, and a heavier charge of explosive mixture admitted to the engine cylinder or cylinders per cycle.

Or, in addition to or in lieu of such cooling means for the mixture, means may be provided for cooling the air supply before it enters the mixture pipe $r$. Thus the air inlet pipe $t$ may pass through a refrigerating or cooling chamber 50 (Figs. 1 and 3).

The mixture tube $r$ may, as shown in Fig. 3, be provided with one or more perforated or deflecting vanes or plates 49 in order further to assist the mixing of the vapor and the air.

As hereinbefore stated, the space external to the boiler from which the air supply for the combustible mixture is drawn and the pressure in which governs the pressure of the vapor produced, instead of being that of the ordinary external atmosphere and therefore at ordinary atmospheric pressure, may be a space or chamber wherein a pressure greater or less than ordinary atmospheric pressure is maintained by the aid of suitable means. Fig. 5 shows diagrammatically such an arrangement wherein 51 is a chamber with which the tube $i$ and, it may be, tube 22 if used, forming part of the reflux condenser, or condensers, and the air supply inlet $t$ communicate, the desired working pressure of the boiler being set up in the said space or chamber by a suitable pump 51.

The reference in the claims to a space external to the vapor space of the boiler is therefore intended to apply to an external space wherein any desired pressure is maintained and not merely to the ordinary external atmosphere. Also, the term vapor space used in the claims means that portion of the boiler wherein the combustible vapor is produced and collected preparatory to flowing into the mixture pipe $r$.

A vapor generator constructed and operating as hereinbefore described although specially advantageous for use in apparatus for supplying combustible vapor in internal combustion engines as set forth can also be used for producing vapor at constant temperature and pressure for other purposes.

What I claim is:—

1. A method of producing vapor for use in an internal combustion engine, which consists in converting liquid fuel into vapor at constant temperature and pressure and in greater volume than is necessary for use in the engine, conducting part of said vapor at the constant pressure from the space in which it is generated to the engine, conducting the surplus vapor at the constant pressure from said space through a separate path in free communication with said vapor space, condensing said surplus vapor in said path and conducting the resulting liquid of condensation away from said vapor generating space to an external collecting space so that it cannot reënter the said vapor generating space, and connecting said separate path at a part thereof between said vapor generating space and said collecting space through a supplementary path to a space in which the same constant pressure obtains as that within the vapor generating space.

2. A method of producing combustible vapor at constant temperature and pressure for use in an internal combustion engine, which consists in vaporizing liquid fuel in greater quantity than is required for use in the engine, in a vapor space in free communication with a space external thereto, conducting part of such vapor to the engine in which it is to be used, through a space also in free communication with said external space, conducting the surplus vapor away from the vapor generating space through a path separate from that through which the first mentioned portion of vapor passes, and which is in free communication with the said vapor generating space and with a liquid collecting space separate from the vapor generating space, condensing said surplus vapor in said separate path and leading the resulting liquid of condensation to the said liquid collecting space and connecting said separate path, at a part thereof between said vapor generating space and said liquid collecting space, through a supplementary path, to said external space.

3. A method of producing a combustible mixture of vapor and air for use in an internal combustion engine, which consists in generating vapor at constant temperature and pressure and in greater volume than is required for use in the engine, by heat in a space in free communication with another space external to said vapor space, conducting part of said vapor from said vapor space to a mixing space, conducting the surplus vapor away from said vapor space through a path separate from that through which the first mentioned portion of the vapor passes and condensing it outside the vapor space, leading the resulting liquid of condensation away from said vapor space so that it cannot come in contact with vapor in said vapor space and admitting air from the said space external to the vapor space and mixing it with the vapor flowing into the mixing space on its way to the engine.

4. A method of producing a combustible mixture of vapor and air for use in an internal combustion engine, which consists in generating vapor at constant temperature and pressure and in greater volume than is required for use in the engine, by heat, in a vapor space, conducting a portion of the heated vapor at the constant pressure from said space to a mixing space in connection with the engine and with an external space in which the same pressure obtains as in the vapor generating space, conducting the surplus vapor at the constant pressure away from the vapor space through a separate path in free communication with said generating space and with a separate liquid collecting space, condensing said surplus vapor in said separate path, connecting said separate path between said vapor generating space and said collecting space to said external space through a supplementary condensing path and mixing the vapor in said mixing space with sufficient air from the said external space to effect its combustion in the engine.

5. A method of producing a combustible mixture of vapor and air for use in an internal combustion engine, which consists in generating vapor at constant temperature and pressure and in greater volume than is required for use in the engine, by heat, in a vapor space, conducting a portion of the heated vapor at the constant pressure, from said space to a mixing space in connection with the engine and with an external space in which the same pressure obtains as in the vapor space, conducting the surplus vapor at the constant pressure away from the vapor space through a separate path in free communication with said vapor generating space, condensing said surplus vapor within the separate path and leading it away from said vapor space, connecting said separate path between its inlet for vapor and outlet for condensed liquid to said external space through a supplementary condensing path, and mixing the vapor in said mixing space with sufficient air in a cold condition to effect its combustion.

6. A method of producing a combustible mixture of vapor and air for use in an internal combustion engine, which consists in generating vapor in excess of requirement at constant temperature and pressure by heat in a vapor space, conducting heated vapor from said space to a mixing space in connection with the engine, supplying a sufficient quantity of cool air to the vapor in the mixing space to effect its complete combustion in the engine condensing the surplus vapor outside said vapor space and leading the resulting liquid of condensation away from said vapor space.

7. A method of producing a combustible mixture of vapor and air for use in an internal combustion engine, which consists in generating vapor at constant temperature and pressure by heat in a vapor space, conducting heated vapor from said space to a mixing space in connection with the engine, admitting sufficient air to and mixing it with the vapor in the mixing space to effect its complete combustion in the engine and cooling the resulting mixture of vapor and air on its way to the engine.

8. A method of producing a combustible mixture of vapor and air for use in an internal combustion engine, which consists in generating vapor in excess of requirements at constant temperature and pressure by heat in a vapor space in free communication with an air space external thereto, conducting part of the vapor from said vapor space to a mixing space in communication with the engine and with said external air space, conducting the surplus vapor away from said vapor space through a separate path to that through which the first mentioned portion of vapor flows into the mixing space and which is in free communication with said vapor generating space, condensing said surplus vapor within said separate path, leading the resulting liquid of condensation to the liquid fuel supply system at a part thereof outside said vapor space, connecting said separate path between its inlet for vapor and outlet for condensed liquid to said external space through a supplementary upwardly extending condensing path so that resulting liquid of condensation will drain back into said separate path and away from the vapor generating space, and supplying air from the said space external to the vapor space to the mixing space in sufficient quantity to effect the complete combustion in the engine of the vapor with which it is mixed in said mixing space.

9. Apparatus for the production of vapor at constant temperature and pressure, comprising a boiler the vapor space of which has two outlets one for vapor to be used and the other for surplus vapor, means for supplying liquid to said boiler, means for heating said boiler and converting liquid therein into vapor in excess of requirement, and a reflux condenser in communication with the second outlet from said vapor space and with the atmosphere external to said space and wherein excess vapor will be condensed and led away from said space.

10. Apparatus for the production of vapor at constant temperature and pressure, comprising a boiler the vapor space of which has two outlets one for vapor to be used and the other for surplus vapor, a liquid supply system and means for feeding liquid therefrom to said boiler, means for heating said boiler and converting liquid therein into vapor in excess of requirement and a reflux condenser in communication with the second outlet from the vapor space, with the external atmosphere and with the liquid fuel supply system.

11. Apparatus for the production of vapor at constant temperature and pressure, comprising a boiler having therein a hot plate and a vapor space having two outlets, one for vapor for use and the other for surplus vapor, a liquid fuel supply system and means for feeding liquid therefrom to the hot plate in said boiler, means for heating said hot plate and converting liquid fed on to it into vapor in excess of requirement, and a reflux condenser in communication with the surplus vapor outlet and with the atmosphere external to said vapor space.

12. Apparatus for the production of vapor at constant temperature and pressure, comprising a boiler the vapor space of which has two outlets one for vapor to be used and the other for surplus vapor, means for supplying liquid to said boiler, said outlets being arranged near opposite ends of the vapor space in said boiler, means for heating said boiler and converting liquid therein into vapor in excess of requirement, and a reflux condenser in communication with the second outlet from said vapor space and with the atmosphere external to said space and wherein excess vapor will be condensed and led away from said space.

13. Apparatus for the production of vapor at constant temperature and pressure, comprising a boiler having therein a hot plate and a vapor space having two outlets, one for vapor for use and the other for surplus vapor, means for distributing the liquid in a thin layer over said hot plate, means for heating said hot plate and converting liquid fed on to it into vapor in excess of requirement and a reflux condenser in communication with the surplus vapor outlet and with the atmosphere external to said vapor space.

14. Apparatus for the production of vapor at constant temperature and pressure comprising a boiler having therein a hot plate and a vapor space having two outlets, one for vapor for use and the other for surplus vapor, said outlets being arranged so that the streams of vapor passing therethrough will flow in substantially opposite directions, means for distributing the liquid in a thin layer over said hot plate, means for heating said hot plate and converting liquid fed on to it into vapor in excess of requirement and a reflux condenser in communication with the surplus vapor outlet and with the atmosphere external to said vapor space.

15. Apparatus for the production of vapor at constant temperature and pressure, comprising a boiler having therein a hot plate and a vapor space having two outlets one for vapor for use and the other for surplus vapor and also an inlet for liquid to be converted into vapor, said outlets being arranged so that the streams of vapor passing therethrough will flow in substantially opposite directions, said hot plate being arranged below said liquid inlet, means for heating said hot plate and converting liquid fed on to it into vapor in excess of that required for use and a reflux condenser in communication with the surplus vapor outlet and with the atmosphere external to said vapor space.

16. Apparatus for the production of vapor at constant temperature and pressure, comprising a boiler embodying a vessel having outlets for vapor at its upper and lower portions and also an inlet for liquid at its upper portion, the wall of the vessel acting as a hot plate, means for distributing liquid in a thin layer over from said inlet onto the inner surface of said hot plate, a liquid supply system and means for feeding liquid therefrom to said liquid inlet, means for heating said hot plate from outside and converting liquid fed on to its inner surface into vapor in excess of requirement and a reflux condenser in communication with the lower vapor outlet from said vessel and with the atmosphere external to the vapor space in said boiler.

17. Apparatus for the production of vapor at constant temperature and pressure, comprising a boiler embodying a vessel having outlets for vapor at its upper and lower portions and also an inlet for liquid at its upper portion, the sides of the vessel acting as a hot plate, means for distributing liquid in a thin layer from said inlet over the inner surface of said hot plate, a liquid supply system and means for feeding liquid therefrom to said liquid inlet, means for directing a heating medium over the outer surface of said hot plate, means for controlling the flow of said heating medium over said hot plate and a reflux condenser in communication with the lower vapor outlet from said vessel and with the atmosphere external to the vapor space in said boiler.

18. Apparatus for producing and supplying a combustible mixture of vapor and air, comprising in combination, a mixture pipe having a valve controlled inlet for air and a valve controlled outlet for connection to an internal combustion engine, a liquid fuel boiler the vapor space of which has two vapor outlets one of which is connected to said mixture pipe between its valve controlled inlet and outlet, means for supplying liquid fuel to said boiler, means for heating said boiler and converting liquid therein into vapor in excess of that required for use in the engine and a reflux condenser connected to the second outlet of said vapor generating space and in communication with the atmosphere external to said space and wherein excess vapor will be condensed and led away from said space.

19. Apparatus for producing and supplying a combustible mixture of vapor and air comprising, in combination a mixture pipe having a valve controlled inlet for air and a valve controlled outlet for connection to an internal combustion engine, a liquid fuel boiler the vapor space of which has two vapor outlets one of which is connected to said mixture pipe between its valve controlled inlet and outlet, a liquid fuel supply system and means for feeding liquid fuel therefrom into said boiler, means for heating said boiler and converting liquid fuel therein into vapor in excess of that required for use in the engine, and a reflux condenser connected to the second outlet of the vapor space and in communication with the atmosphere external to said space and with the liquid fuel supply system.

20. Apparatus for producing and supplying a combustible mixture of vapor and air comprising in combination, a mixture pipe having a valve controlled inlet for air and a valve controlled outlet for connection to an internal combustion engine, a liquid fuel boiler having therein a hot plate and a vapor space having two vapor outlets one of which is connected to said mixture pipe between its valve controlled inlet and outlet, and an inlet for liquid fuel above said hot plate, a liquid fuel supply system and means for feeding liquid fuel therefrom to said liquid fuel inlet, means for heating said hot plate and converting liquid fuel fed on to it into vapor in excess of that required for the engine and a reflux condenser connected to the second outlet of the vapor space and in communication with the atmosphere external to said vapor space and wherein excess vapor will be condensed and led away from said space.

21. Apparatus for producing and supplying a combustion mixture of vapor and air comprising, in combination, a mixture pipe having a valve controlled inlet for air and a valve controlled outlet for connection to an internal combustion engine, a liquid fuel boiler having therein a hot plate and a vapor space having two vapor outlets one of which is connected to said mixture pipe between its valve controlled inlet and outlet and an inlet for liquid fuel above said hot plate, said vapor outlets being arranged near opposite end portions of the said vapor space, a liquid fuel supply system and means for feeding liquid fuel therefrom to said liquid fuel inlet, means for heating said hot plate and converting liquid fuel fed on to it into vapor in excess of that required for the engine and a reflux condenser connected to the second outlet of the vapor space and in communication with the atmosphere external to said vapor space and wherein excess vapor will be condensed and led away from said space.

22. Apparatus for producing and supplying a combustible mixture of vapor and air comprising, in combination, a mixture pipe having a valve controlled inlet for air and a valve controlled outlet for connection to an internal combustion engine, a liquid fuel boiler having therein a hot plate and a vapor space having two vapor outlets one of which is connected to said mixture pipe between its valve controlled inlet and outlet and an inlet for liquid fuel above said hot plate, a liquid fuel supply system and means for feeding liquid fuel therefrom to said liquid fuel inlet, means for heating said hot plate and converting liquid fuel fed on to it into vapor in excess of that required for the engine and a reflux condenser connected to the second outlet of the vapor space and in communication with the atmosphere external to said vapor space and with the liquid fuel supply system.

23. Apparatus for producing and supplying a combustible mixture of vapor and air comprising, in combination, a mixture pipe having a valve controlled inlet for air and a valve controlled outlet for connection to an internal combustion engine, a liquid fuel boiler comprising a vessel having therein a vapor space with two vapor outlets one of which is connected to said mixture pipe between its valve controlled inlet and outlet and an inlet for liquid fuel, the wall of said vessel forming a hot plate and said inlet being arranged to deliver liquid fuel against the inner surface of said wall, a liquid fuel supply system and means for feeding liquid fuel therefrom to said liquid fuel inlet, means for heating said hot plate externally and converting liquid fuel fed against its inner surface into vapor in excess of that required for the engine and a reflux condenser connected to the second outlet of the vapor space and in communication with the atmosphere external to said vapor space and with the liquid fuel supply system.

24. Apparatus for producing and supplying a combustible mixture of vapor and air comprising, in combination, a mixture pipe having a valve controlled inlet for air and a valve controlled outlet for connection to an internal combustion engine, a liquid fuel boiler comprising a vessel and a surrounding casing, said vessel having vapor outlets at its upper and lower end portions, the upper one being in communication with the mixture pipe between its valve controlled inlet and outlet and also an inlet for liquid fuel at its upper portion, the wall of said vessel below said liquid fuel inlet serving as a hot plate against the upper part of the inner surface of which liquid fuel is delivered from said inlet, a liquid fuel supply system and means for feeding liquid fuel therefrom to said liquid fuel inlet, means for supplying heating fluid to said casing for heating said vessel externally and converting liquid fuel fed over its inner surface into vapor in excess of that required for the engine and a reflux condenser connected to the lower vapor outlet of said vessel and in communication with the atmosphere external to said vapor space and with the liquid fuel supply system.

25. Apparatus for producing and supplying a combustible mixture of vapor and air, comprising in combination, a mixture pipe having a valve controlled inlet for air and a valve controlled outlet for connection to an internal combustion engine, a liquid fuel boiler comprising a vertically arranged vessel and a surrounding casing, said vessel having vapor outlets at its upper and lower end portions, the upper one being in communication with the mixture pipe between its valve controlled inlet and outlet, and also an inlet for liquid fuel at its upper portion, the wall of said vessel below said inlet serving as a hot plate, means for delivering liquid fuel over the upper portion of the inner surface of said wall or hot plate, a liquid fuel supply system and means for feeding liquid fuel therefrom to said liquid fuel inlet, means for directing a heating medium into said casing so that it will flow around the side wall of said vessel and convert liquid fuel fed on to the inner surface of said wall into vapor in excess of that required for the engine and a reflux condenser connected to the lower vapor outlet of said casing and in communication with the atmosphere external to said vapor space and with the liquid fuel supply system.

26. Apparatus for producing and supplying a combustible mixture of vapor and air, comprising, in combination, a mixture pipe having a valve controlled inlet for air and a valve controlled outlet for connection to an internal combustion engine, a liquid fuel boiler comprising a vessel having therein a vapor space with two vapor outlets one of which is connected to said mixture pipe between its valve controlled inlet and outlet and an inlet for liquid fuel, the wall of said vessel forming a hot plate, a liquid distributing ring arranged below said liquid inlet to distribute liquid fuel in a thin layer over the upper portion of the inner surface of the side wall of said vessel, a liquid fuel supply system and means for feeding liquid fuel therefrom to said liquid fuel inlet, means for heating said hot plate externally and converting liquid fuel fed against its inner surface into vapor in excess of that required for the engine and a reflux condenser connected to the second outlet of the vapor space and in communication with the atmosphere external to said vapor space and with the liquid fuel supply system.

27. Apparatus for the production of vapor at constant temperature and pressure, comprising a boiler the vapor space of which has two outlets, one for vapor to be used and the other for surplus vapor, a casing for said boiler to receive heating fluid for heating said boiler and converting liquid therein into vapor in excess of requirement, means whereby heating fluid can be caused to enter said casing or be by-passed partly or wholly therefrom and a reflux condenser in communication with the second outlet from said vapor space and with the atmosphere external to said space and wherein said excess vapor will be condensed and led away from said space.

28. Apparatus as specified in claim 25, wherein means are provided for directing the heating medium into said casing and for controlling the amount of heating fluid admitted to said casing.

29. Apparatus for producing and supplying a combustible mixture of vapor and air, comprising in combination, a mixture pipe having a valve controlled inlet for air and a valve controlled outlet for connection to an internal combustion engine, a liquid fuel boiler the vapor space of which has two vapor outlets one of which is connected to said mixture pipe between its valve controlled inlet and outlet, means for supplying liquid fuel to said boiler, means for heating said boiler and converting liquid therein into vapor in excess of that required for use in the engine, a reflux condenser connected to the second outlet of said vapor generating space and in communication with the atmosphere external to said space and wherein excess vapor will be condensed and led away from said space, and a non-return valve associated with the reflux condenser to prevent air being admitted to the vapor space of said boiler when starting the engine to which said mixture pipe is connected.

30. The combination with an internal combustion engine of apparatus for producing a combustible mixture of vapor and air for use in said engine, said apparatus comprising a mixture pipe having a valve controlled inlet for air and a valve controlled outlet connected to the fuel inlet of the engine, a liquid fuel boiler the vapor space of which has two outlets one of which is connected to said mixture pipe between the valve controlled inlet and outlet, a liquid fuel supply system, means for delivering liquid fuel therefrom into said boiler, a reflux condenser connected to the second outlet of the vapor generating space of the boiler and in communication with the atmosphere external to said space and with the liquid fuel supply system, a non-return valve associated with the reflux condenser and adapted to prevent air entering the vapor space of said boiler when starting the engine and a casing associated with said boiler and connected to the exhaust of said engine so that hot exhaust gases from the engine can be utilized in said casing to heat said boiler and convert liquid fuel therein into vapor in excess of that required in said engine.

31. The combination with an internal combustion engine of apparatus for producing a combustible mixture of vapor and air for use in said engine, said apparatus comprising a mixture pipe having a valve controlled inlet for air and a valve controlled outlet connected to the fuel inlet of the engine, a liquid fuel boiler the vapor space of which has two outlets one of which is connected to said mixture pipe between the valve controlled inlet and outlet, a liquid fuel supply system, means for delivering liquid fuel therefrom into said boiler, a reflux condenser connected to the second outlet of the vapor generating space of the boiler and in communication with the atmosphere external to said space and with the liquid fuel supply system, a non-return valve associated with the reflux condenser and adapted to prevent air entering the vapor space of said boiler when starting the engine, a casing surrounding said boiler and having an inlet and outlet for hot gases, said inlet being in connection with the exhaust outlet of said engine, a by-pass between the inlet and outlet of said casing and means whereby any desired portion of the hot exhaust gases can be admitted to the casing or by-passed therefrom.

32. The combination with an internal combustion engine of apparatus for producing a combustible mixture of vapor and air for use in said engine, said apparatus comprising a mixture pipe having a valve controlled inlet for air and a valve controlled outlet connected to the fuel inlet of the engine, means for cooling said mixture pipe, a liquid fuel boiler the vapor space of which has two outlets one of which is connected to said mixture pipe between the valve controlled inlet and outlet, a liquid fuel supply system, means for delivering liquid fuel therefrom into said boiler, a reflux condenser connected to the second outlet of the vapor generating space of the boiler and in communication with the atmosphere external to said space and with the liquid fuel supply system, a non-return valve associated with the reflux condenser and adapted to prevent air entering the vapor space of said boiler when starting the engine and a casing associated with said boiler and connected to the exhaust of said engine so that hot exhaust gases from the engine can be utilized in said casing to heat said boiler and convert liquid fuel therein into vapor in excess of that required in said engine.

33. The combination with an internal combustion engine of apparatus for producing a combustible mixture of vapor and air for use in said engine, said apparatus comprising a mixture pipe having a valve controlled inlet for air and a valve controlled outlet connected to the fuel inlet of the engine, a liquid fuel boiler the vapor space of which has two outlets one of which is connected to said mixture pipe between the valve controlled inlet and outlet, a liquid fuel supply system, means for delivering liquid fuel therefrom into said boiler, a reflux condenser connected to the second outlet of the vapor generating space of the boiler and in communication with the atmosphere external to said space and with the liquid fuel supply system, a non-return valve associated with the reflux condenser and adapted to prevent air entering the vapor space of said boiler when starting the engine, means whereby the boiler can be heated by hot exhaust products of combustion from the engine and supplementary means for heating the boiler preparatory to the starting of the engine.

Signed at Edinburgh, Scotland, this second day of November, 1917.

WILLIAM HAY CALDWELL.

Witnesses:
   HELEN SUTHERLAND,
   VERNON HALL.